United States Patent
Bain

[19]

[11] Patent Number: 5,902,181

[45] Date of Patent: May 11, 1999

[54] DIVERTER VALVE ASSEMBLY FOR AN AUTOMOBILE HVAC SYSTEM

[75] Inventor: Mark Bain, Harrison Township, Mich.

[73] Assignee: Chrysler Corporation, Auburn Hills, Mich.

[21] Appl. No.: 09/071,615

[22] Filed: May 1, 1998

[51] Int. Cl.[6] .................................................. B60H 1/26
[52] U.S. Cl. .......................................................... 454/144
[58] Field of Search ................................... 454/121, 143, 454/144, 152, 306

[56] References Cited

U.S. PATENT DOCUMENTS

| | | |
|---|---|---|
| 1,966,882 | 7/1934 | Bucklen . |
| 3,661,069 | 5/1972 | Grosseau . |
| 4,216,822 | 8/1980 | Izumi . |
| 4,343,230 | 8/1982 | Lundstrom ............................. 454/144 |

FOREIGN PATENT DOCUMENTS

| | | |
|---|---|---|
| 2010063 | 9/1971 | Germany ............................... 454/144 |
| 57-15011 | 1/1982 | Japan ..................................... 454/144 |

*Primary Examiner*—Harold Joyce
*Attorney, Agent, or Firm*—Kenneth H. Maclean

[57] ABSTRACT

An air flow diverter valve assembly that includes a housing provided with an air inlet opening and at least a pair of air outlet openings one of which is located in the upper wall of the housing and in which a diverter valve is rotatably supported in the housing for movement between positions which allow the air to flow through one or the other of the air outlet openings. The diverter valve includes a pair of laterally spaced end walls each of which has the general shape of a triangle and has first and second angularly spaced and intersecting edges interconnected by a peripheral edge. A first shutter member is connected to and extends transversely between the first edges of the pair of end walls and a second shutter member is connected to and extends transversely between the peripheral edge of each of the pair of end walls beginning at the first edge of each of the end walls and terminating intermediate the first and second edges of each of the pair of end walls so as to define an opening between the first shutter member and the second shutter member.

15 Claims, 5 Drawing Sheets

DIVERTER VALVE ASSEMBLY FOR AN AUTOMOBILE HVAC SYSTEM

FIELD OF THE INVENTION

This invention concerns heating, ventilating and air conditioning systems in general and, more particularly, is directed to a diverter valve assembly incorporated in such system for providing treated air to the passengers of an automotive vehicle.

BACKGROUND OF THE INVENTION

Various air distribution systems and air-flow diverters have been proposed for use in heating, ventilating, and air conditioning (HVAC) systems. For example, U.S. Pat. No. 4,413,550 in the name of Piano and issued on Nov. 8, 1983 discloses a ventilating system that is intended to maximize the vehicle passenger's sensations of comfort with respect to air flow and temperature. It achieves this by supplying the passenger compartment with two series of air flows. The first is a series of substantially pulsating air flows, each of which is cyclically discontinued for a predetermined period of time and directed to the upper passenger compartment at the head zone. The second is a substantially continuous air flow directed into the lower passenger compartment at the lower torso and foot zone. The method of ventilation is realized by a rotatable member, which is similar to a cam. The rotatable member is located inside of a cylindrical housing and is operated by a geared motor unit. The air is controlled by rotating disks that are also rotated by the motor unit.

Another patent disclosing an air distribution system can be seen in U.S. Pat. No. 4,216,822 in the name of Izumi and issued on Aug. 12, 1980. This patent shows an airflow distributing device for an automotive air conditioning system. The device serves to mix a selected ratio of hot and cold air to achieve a desired temperature and then distributes the air at desired ratios between selected passenger areas. For this purpose, the device uses a rotatably fixed mode plate and a cylindrical chamber subdivided into three cells with each of the cells respectively communicating with a selected portion of the passenger compartment. In this manner, the device is able to control the ratio of hot and cold air into any of the three cells in whole or in controlled separate amounts.

In addition, the U.S. Pat. No. 3,661,069 in the name of Grosseau and issued on May 9, 1972 shows an air distribution device that has similarities to the device seen in the above mentioned '822 patent. In this instance, Grosseau uses a multi-damper door set-up that serves to mix a selected ratio of hot and cold air to achieve a desired temperature and then distributes the air at desired ratios between selected passenger areas. Grosseau utilizes a main cylindrical housing subdivided into two compartments by a rotatable blade-type shutter to control the direction of the climatized air into one or both of the air outlets available. The climatized air is obtained by the use of two additional shutters for the control of fresh and warm air stream ratios.

SUMMARY OF THE INVENTION

The present invention concerns an air flow diverter valve assembly that includes a unique arrangement of a diverter valve and supporting housing for selectively directing hot or cold air to the passenger area of an automotive vehicle at the head level or at the foot level of a passenger. The present invention differs from the above-described air distribution systems shown in the Izumi, Grosseau, and Piano patents in that the invention provides a low cost and simple diverter valve assembly in which a single diverter valve serves to shut off flow of the treated air completely or, if desired, serves to only allow the treated air to flow through a selected area of the passenger compartment.

More specifically, the air flow diverter valve assembly according to the present invention is combined with an HVAC unit and includes a duct connected at one end thereof to the HVAC unit for allowing treated air to flow therethrough. The air flow diverter valve assembly has a housing provided with an air inlet opening and at least a pair of air outlet openings with the other end of the duct being connected to the air inlet opening of the housing. One of the pair of air outlet openings serves to allow heated air to flow from the HVAC unit to the passenger area of the vehicle at a first level for distributing the treated air along the floor of the vehicle. The other of the pair of air outlets is located in the upper wall of the housing and is adapted to allow the treated air to flow to a level substantially above the floor of the vehicle. A diverter valve is supported in the housing by a pivot shaft for pivotal movement and includes a pair of laterally spaced end walls. Each of the end walls has the general shape of a triangle and has first and second angularly spaced and intersecting edges interconnected by a peripheral edge. The first and second edges of each of the end walls are rigidly connected to the pivot shaft at the intersection of the edges. Also, a first shutter member is rigidly connected to and extends transversely between the first edges of the pair of end walls. In addition, a second shutter member is rigidly connected to and extends transversely between the peripheral edge of each of the pair of end walls beginning at the first edge of each of the end walls and terminating intermediate the first and second edges of each of the pair of end walls so as to define an opening between the first shutter member and the second shutter member. The arrangement is such that the diverter valve is movable to a first position wherein the first shutter member is located in a plane parallel to the flow of the treated air and the second shutter member closes the other of the pair of openings so that the treated air flows directly through the housing and exits along the floor of the vehicle. The diverter valve is also movable to a second position wherein the opening directing air flow along the floor is closed by the first shutter member and the opening directing air to the level above the floor is opened.

BRIEF DESCRIPTION OF THE DRAWINGS

Other features and advantages of the present invention will be more apparent from the following detailed description when taken with the drawings in which.

DETAILED DESCRIPTION OF THE PREFERRED EMBODIMENT

Figure 1:
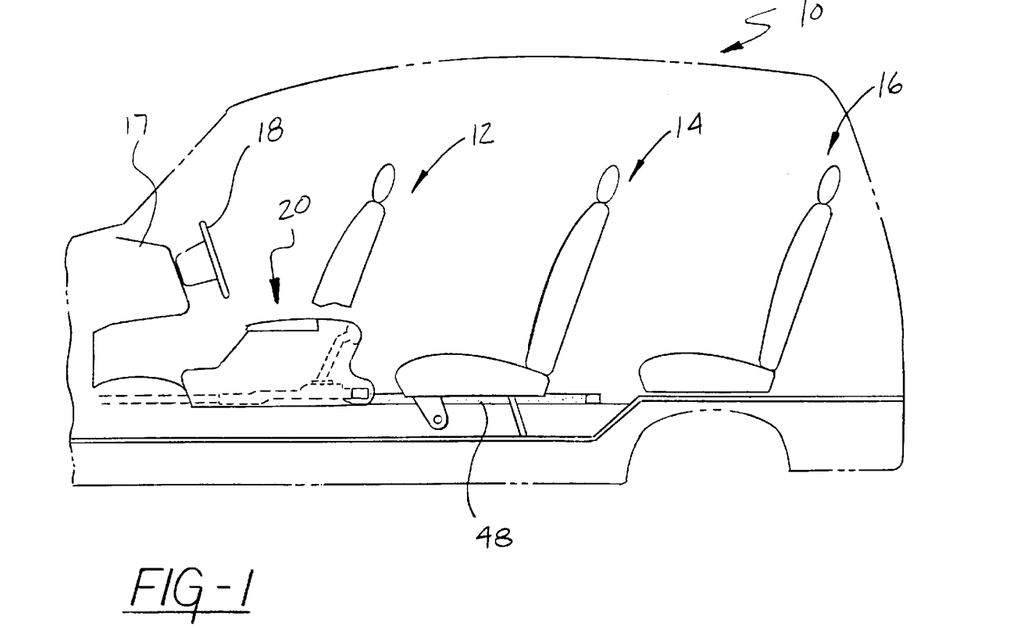
FIG. 1 is an elevational view of the passenger compartment of an motor vehicle provided with a console between the driver' seat and the front passenger's seat that incorporates a diverter valve assembly made in accordance with the present invention.
Figure 2:
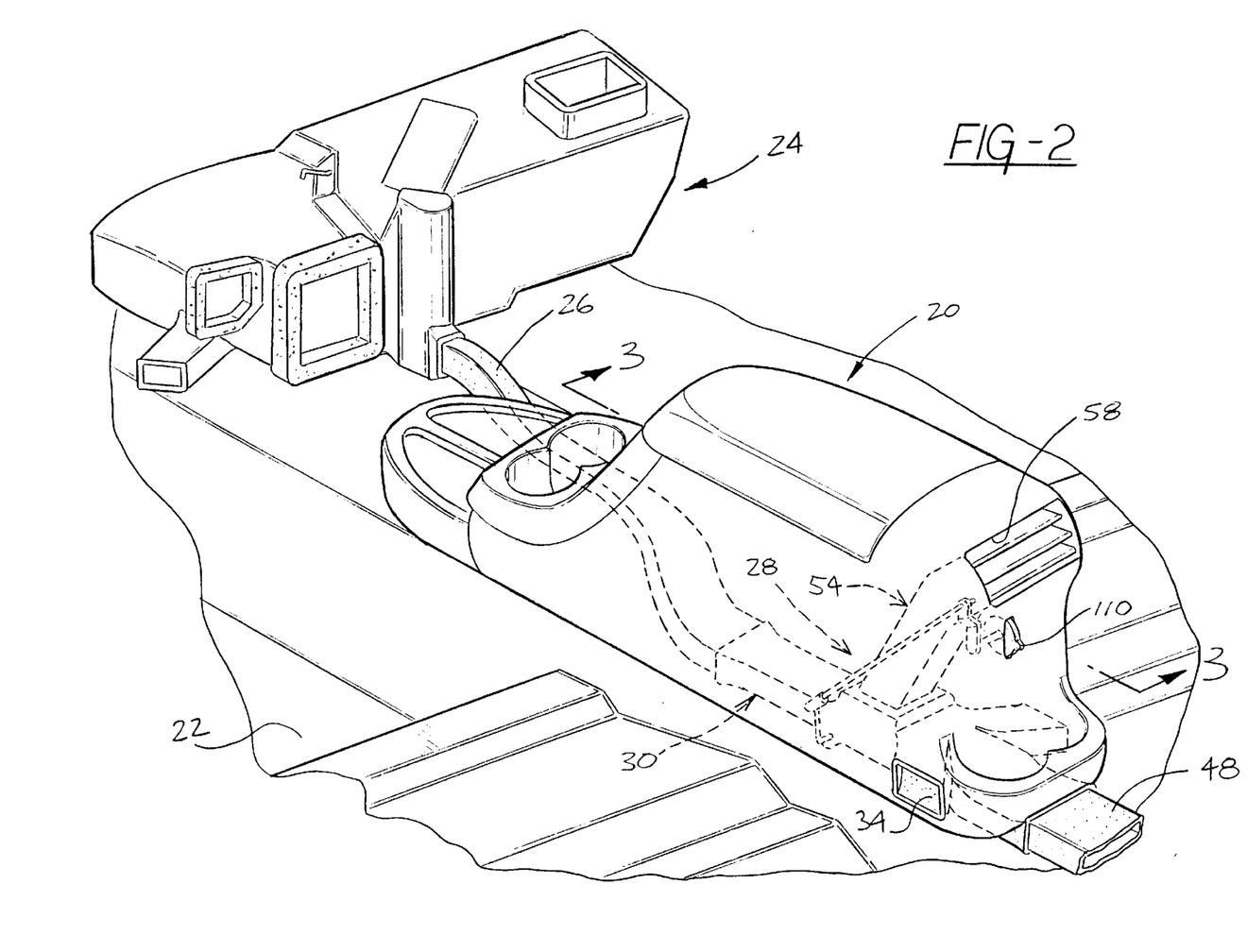
FIG. 2 is a perspective view of a part of the driver compartment of the motor vehicle of FIG. 1 with the instrument panel and front seats removed to more clearly show the HVAC unit and the console incorporating the diverter valve assembly.

Referring to the drawings and more particularly to FIGS. 1 and 2 thereof, a partial view of a motor vehicle 10 is shown with the vehicle taking the form of a mini-van having the interior thereof provided with front seats 12, middle seats 14, and rear seats 16. The front seats 12 include a driver's seat (not shown) and a front passenger's seat. The instrument panel 17 of the vehicle 10 is combined with a steering wheel 18 to be operated by the driver. Only the back rest of the front passenger's seat is shown located along side of an upstanding console 20 which, as is conventional, is positioned between the driver's seat and the front passenger's seat. The middle seats 14 and the rear seats 16 are provided in the vehicle 10 for seating of passengers to be transported by the vehicle. All of the seats 12–16 of the vehicle 10 are secured to a floor pan 22 of the vehicle 10 in the usual manner so as to allow the driver's and the front passenger's seats 12 to the adjustable to fore and aft and other positions, and to allow the rear passenger's seats 14 and 16 to be removed, if desired, to provide room for cargo in the rear area of the vehicle 10.

As best seen in FIG. 2, the cover of the instrument panel 17 is removed to expose an HVAC unit 24 which provides ventilating air at ambient temperature and/or treated air that is either cooled or heated to the vehicle interior depending upon the wishes of the driver and passengers of the vehicle 10. The HVAC unit 24 is connected to a duct 26 which extends rearwardly from the HVAC unit 24 and has its air outlet end connected to an air flow diverter valve assembly 28 made in accordance with the present invention and located within the console 20. As will become more apparent as the description of the invention proceeds, the duct 26 serves to supply either the ventilating air or treated air to the diverter valve assembly 28 which then, according to the desires of the rear passengers, provides the air at either the vehicle floor level or at a level substantially above the floor (head level) to the passenger compartment located rearwardly of the front seats 12.

Figure 3:
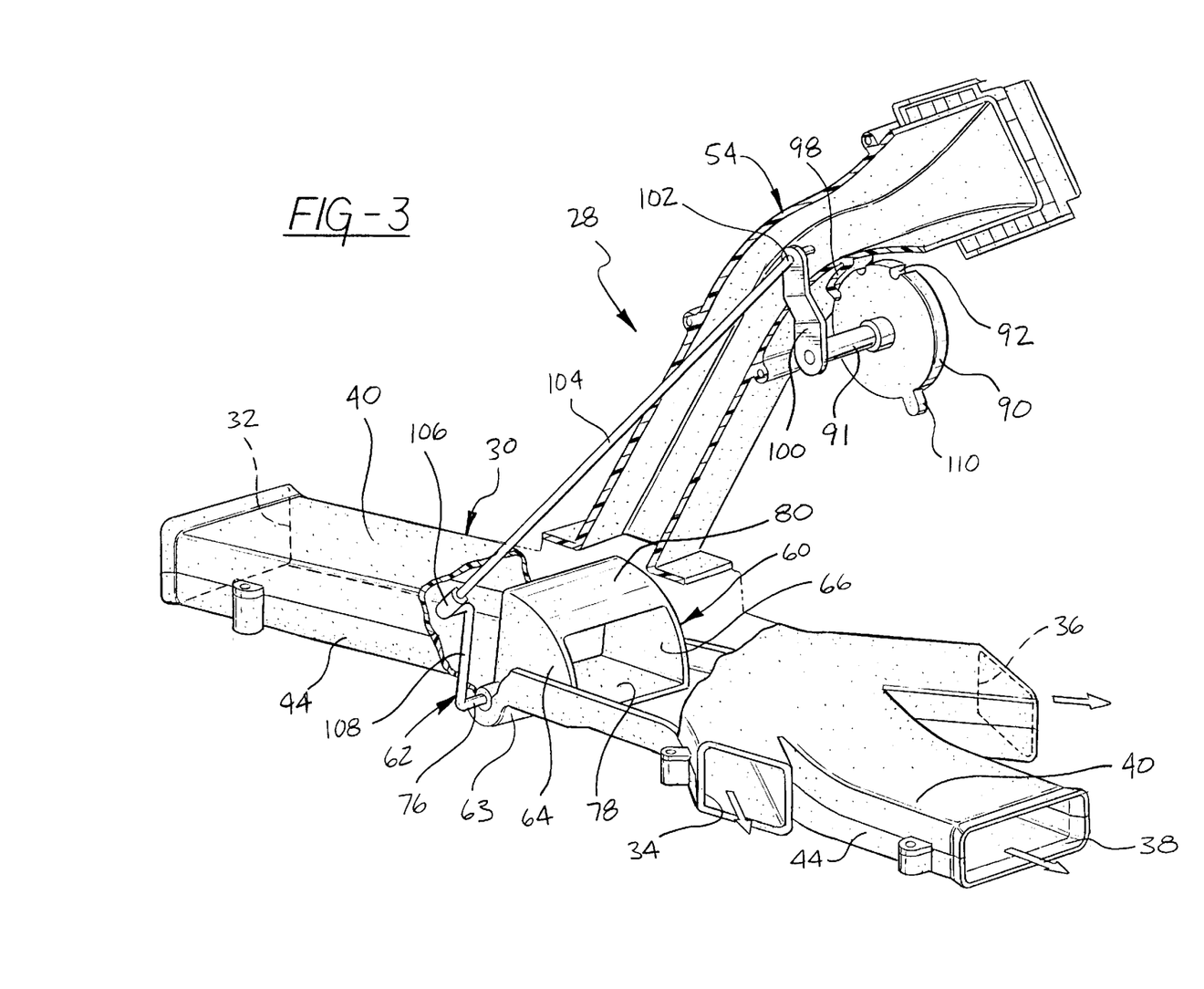
FIG. 3 is a perspective view of the diverter valve assembly with parts of the housing broken away to reveal in more detail the diverter valve and the actuator assembly.
Figure 4:
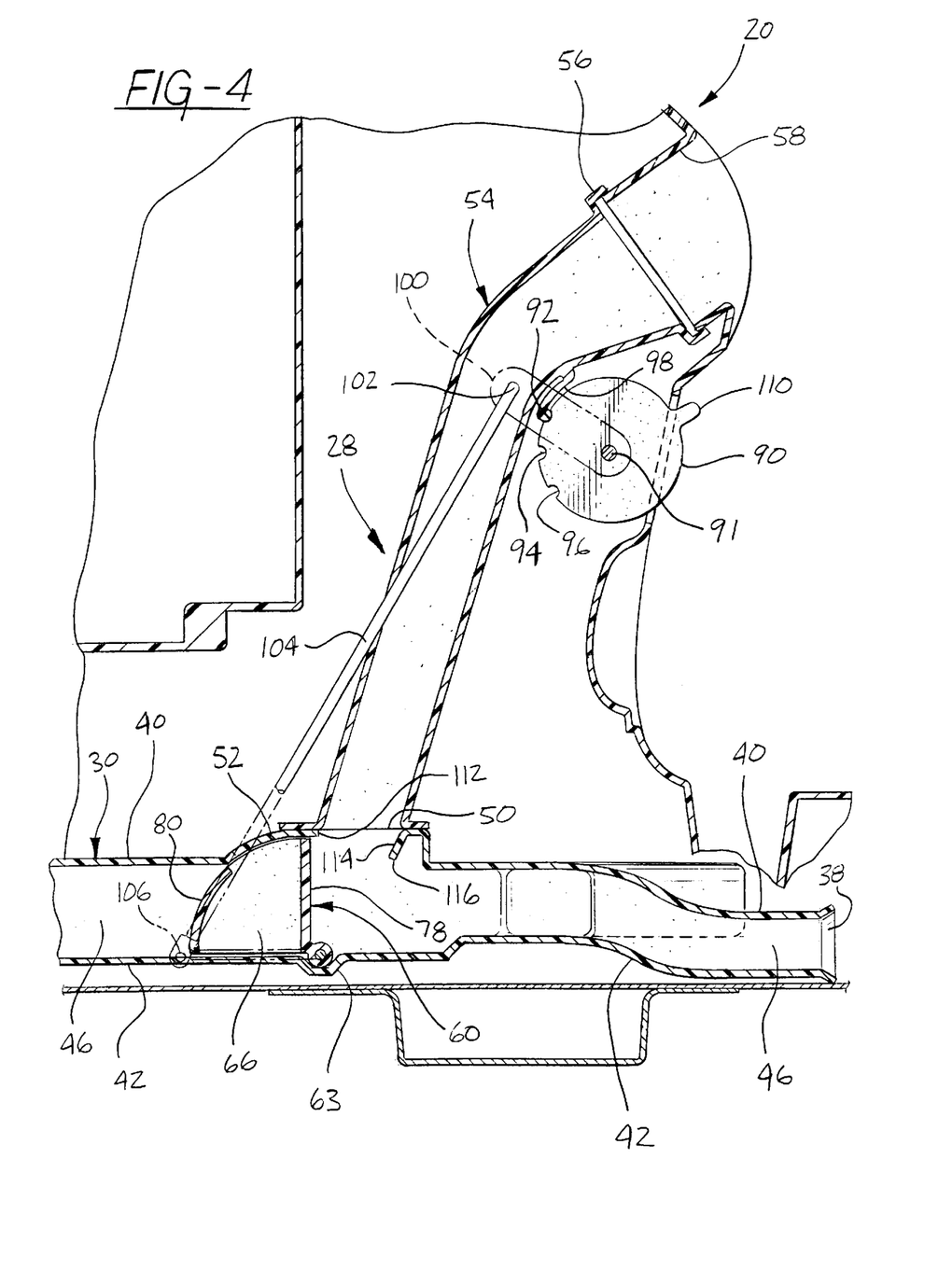
FIG. 4 is enlarged sectional view taken on line 3—3 of FIG. 2 showing in detail the diverter valve assembly incorporated in the console and also shows the actuator assembly which in this instance has the diverter valve in a closed position.

As best seen in FIGS. 3 and 4, the diverter valve assembly 28 includes a plastic housing 30 which is generally rectangular in cross section and is comprised of two sections interconnected to provide an air inlet opening 32 at one the front end of the housing 30. The housing 30 is also formed with a pair of substantially horizontally aligned side air outlet openings 34 and 36 and an in-line rear air outlet opening 38, all of which are located at the opposite rear end of the housing 30. The air inlet opening 32 and the air outlet openings 34–38 in the housing 30 are each defined by an upper or top wall 40, a lower or bottom wall 42 and a pair of laterally spaced side walls 44 and 46 formed by the two sections of the housing 30. As seen in FIG. 2, the side air outlet openings 34 and 36 connect with side openings formed in the lower rear end of the console 20 for supplying treated air to the passengers sitting in the middle seats 14. On the other hand, the rear air outlet opening 38, which is axially aligned with the air inlet opening 32 of the housing 30, connects with a duct 48 that serves to provide treated air to the passengers sitting in the rear seats 16.

As seen in FIG. 4, an additional rectangular outlet opening 50 is located in the upper wall 40 of the housing 30 at a point generally midway between the inlet opening 32 and the outlet opening 38. The opening 50 is located aft of a curved section 52 of the upper wall 40 and is sealingly connected with the lower end of a cold air duct 54 that extends upwardly and has its upper end angled towards the head of a passenger that may be seated in the middle seats 14. The duct 54 terminates with an air outlet end 56 that connects with a port 58 formed in the upper rear end of the console 20. Below the curved section 52 of the upper wall 40, a diverter valve 60 is located in the housing 30 and is supported by a pivot shaft 62 for rotation about a pivot axis that extends transversely to the longitudinal axis of the housing 30. The pivot shaft 62 is located in a trough 63 that is formed in the bottom wall 42 of the housing 30. The diverter valve 60, which is controlled by an actuator to be described, allows a passenger seated in the middle seats 14 to selectively direct treated air entering the housing 30 from the HVAC unit 24 either to the outlet openings 34–38 or through the opening 50 as will be explained hereinafter.

Figure 7:
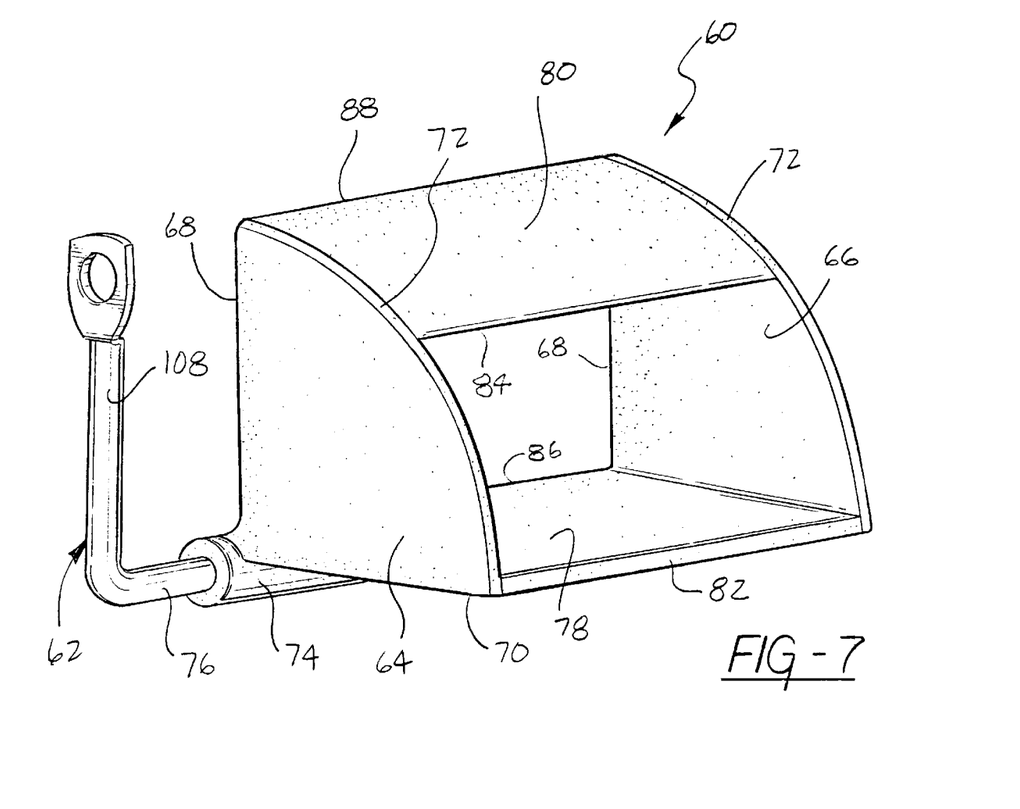
FIG. 7 is an enlarged perspective view of the diverter valve, which forms a part of the diverter valve assembly.

As best seen in FIGS. 3 and 7, the diverter valve 60 is made of a plastic material and includes a pair of parallel, identical, and laterally spaced side walls 64 and 66 each of which can be generally shaped as a triangle but, in the preferred form, have the configuration of a quarter of a circle. As best seen in FIG. 7, each side wall 64 and 66 has angularly spaced and intersecting straight edges 68 and 70 of equal length with the outer ends thereof being joined by a curved edge 72. At the intersection of the straight edges 68 and 70 of each side wall 64 and 66, the edges 68 and 70 are integrally molded with a cylindrical sleeve 74 which, in turn, is rigidly molded about the shaft portion 76 of the pivot shaft 62. The shaft portion 76 of the pivot shaft 62 together with the sleeve 74 is supported within the aforementioned trough 63 formed in the bottom wall 42 of the housing 30 and allows pivotal movement of the diverter valve 60 about the aforementioned pivot axis. A planar shutter member 78 is integral with the straight edges 70 of the side walls 64 and 66 and extends therebetween so as to interconnect the straight edges 70. An additional shutter member 80, which is of the same curvature as the curved edge 72 of each side wall 64 and 66, is integral with and extends between the curved edges 72 of the side walls 64 and 66 starting at the edge 68 and terminating approximately midway between the edges 68 and 70 of the side walls 64 and 66 so as to leave a front opening between the shutter members 78 and 80. The front opening is generally rectangular and is defined by a front edge 82 of the shutter member 78, a front edge 84 of the shutter member 80, and the edges 72 of the sidewalls 64 and 66. As seen in FIG. 7, a rear rectangular opening is also provided in the diverter valve 60 that is defined by a rear edge 86 of the shutter member 78, a rear edge 88 of the shutter member 80 and the straight edges 68 of the side walls 64 and 66.

The actuator assembly for operating and positioning the diverter valve 60 between the aforementioned positions can best be seen in FIGS. 3 and 4. In this regard, the actuator assembly is located in the console 20 just below the air outlet port 58 and includes a disk-shaped actuator 90 that is supported for rotation by a shaft 91 which is rigidly fixed to the actuator 90. Although not shown, it will be understood that the shaft 91 is supported by structure incorporated within the console 20 for rotation about an axis parallel to the axis about which the diverter valve 60 rotates. The actuator 90 has three equally spaced notches 92, 94, and 96 formed in its periphery that cooperate with a spring like detent 98 integral with the duct 54. A lever 100 is fixed at one end to the shaft 91 and has its free end connected by a pivotal connection 102 to one end of a link 104. The other end of the link 104 is connected by a pivotal connection 106 to an upstanding arm 108 that is integrally formed with the pivot portion 76 of the pivot shaft 62 and extends at an angle of ninety degrees therefrom. As seen in FIGS. 2 and 4, the actuator 90 is formed with a radially outwardly extending projection 110 which projects out of the console 20 and can be finger operated by a passenger seated in the middle seats 14 to provide the desired flow of the treated air to the rear passengers.

Before explaining the operation of the diverter valve assembly 28, it will be noted that as seen in FIG. 4, the rectangular opening 50 in the upper wall 40 of the housing 30 is partially defined by a straight edge 112 of the curved section 52 and a downwardly projecting lip 114 integral with the upper wall 40 that terminates with edge 116 which is parallel to the edge 112. The inner surface of the curved section 52 and the edge 116 of the lip 114 are located on a common circle the center of which is located at the center longitudinal axis of the shaft portion 76 of the pivot shaft 62. Similarly, the outer surface of the shutter member 80 and the straight edge 82 of the shutter member 78, as seen in FIG. 7, are located on a common circle having the same center as the inner surface of the curved section 52 but spaced therefrom slightly so that substantial sealing occurs between the shutter members 78 and 80 and the inner parts of the housing 30 when the diverter valve 60 is moved to its various positions which now will be described.

As seen in FIG. 4, the actuator 90 has its upper most notch 92 cooperating with the detent 98 to maintain the diverter valve 60 in the closed position through the lever 100 and link 104. In this position of the diverter valve 60, the shutter members 78 and 80 cooperate with the curved section 52 of the upper wall 40 of the housing 30 to close the passage in the housing 30 leading from the inlet opening 32 and prevent air flow to the outlet openings 34–38 and to the duct 54 via opening 50. When the HVAC unit 24 is conditioned for providing cool air to the interior of the vehicle 10, the passenger in the middle seats 14 can manually grasp the finger projection 110 of the actuator 90 and move it downwardly so as to rotate the actuator 90 in a clockwise direction together with shaft 91 to the position seen in FIG. 5. As the actuator 90 moves in the clockwise direction, the lever 100 will move in the same direction to raise the link 104 and cause the latter to rotate the diverter valve 60 in a clockwise direction from the position of FIG. 4 to the position of FIG. 5. At this point, the detent 98 will drop into the middle notch 94 of the actuator 90 so that the FIG. 5 position of the diverter valve 60 will be maintained. In this position of the diverter valve 60, the curved shutter member 80 of the diverter valve 60 will be in sealing relationship with the inner surface of the curved section 52 of the upper wall 40 and expose the rear opening in the diverter valve 60 to the cooled air entering the housing 30 through inlet opening 32. At the same time, the front edge 82 of the shutter member 78 will cooperate with the edge 116 of lip 114 to close the passage leading to the outlet openings 34–38 of the housing 30 and connect the front opening in the diverter valve 60 with the opening 50 in the upper wall 40 of the housing 30 through the rear opening in the diverter valve 60. As a result, the cooled air will flow, as indicated by the arrows, through the front and rear openings in the diverter valve 60 and through the opening 50 in the upper wall 40 to the duct 54 and exit at the port 58 in the upper rear end of the console 20 at a level above the floor so that the cooled air circulates about the heads of the rear passengers. Thus, it should be apparent that, in this instance, the shutter member 78 serves as a diverter to cause the cooled air to flow upwardly into the duct 54.

Figures 5, 6:
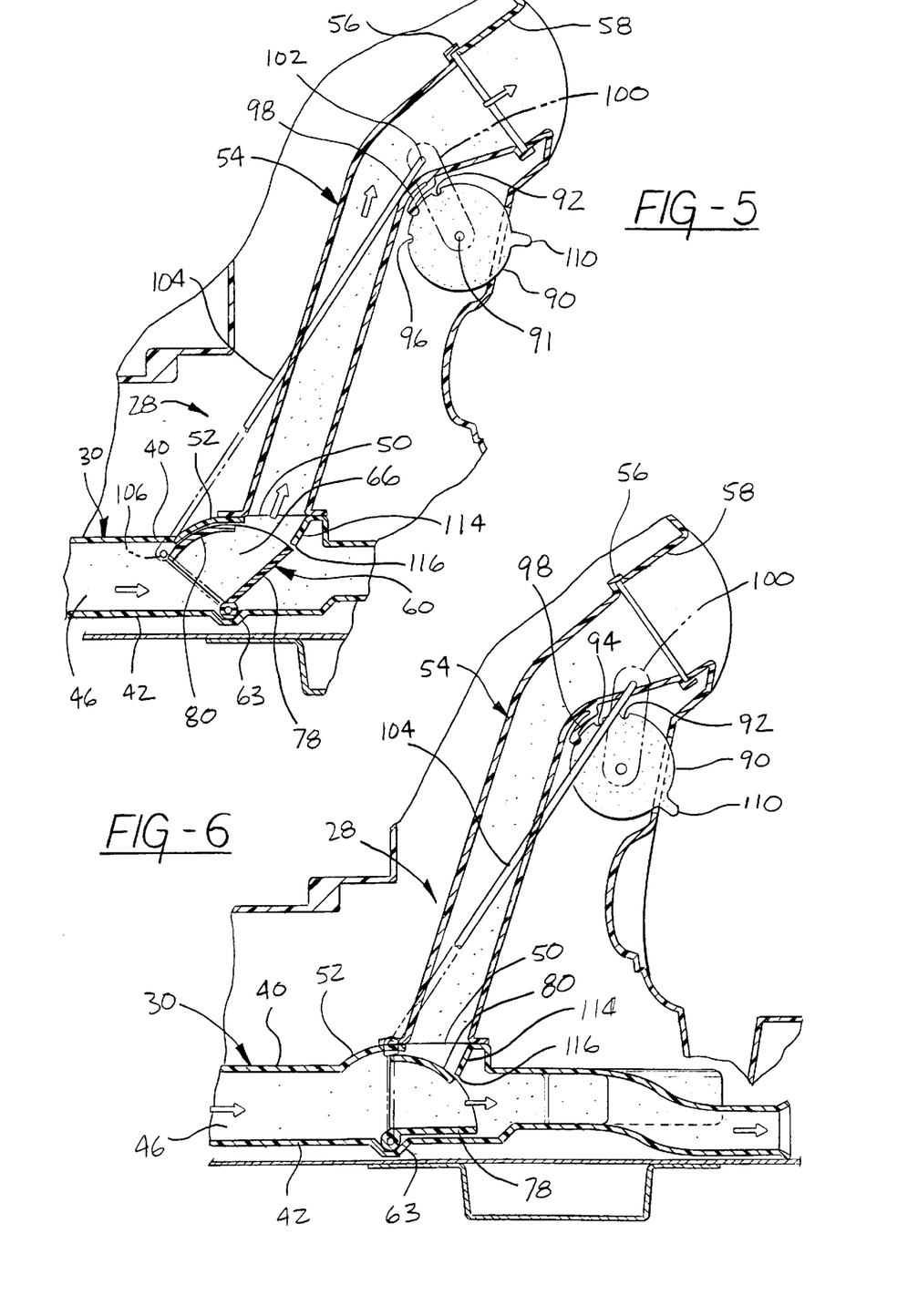
FIG. 5 is a view similar to that seen in FIG. 3 with the actuator assembly conditioned for having the diverter valve maintained in a position for providing treated air to the rear passenger compartment at a level substantially above the floor of the vehicle.
FIG. 6 is a view similar to that seen in FIG. 3 with the actuator assembly conditioned for having the diverter valve maintained in a position for providing treated air to the rear passenger compartment along the floor level of the vehicle.

When the HVAC unit 24 is conditioned for providing heated air to the interior of the vehicle 10, the passenger in the middle seats 14 can move the finger projection 110 of the actuator 90 further downwardly so that the actuator 90 moves from the position of FIG. 5 to that of FIG. 6. The clockwise rotation of the actuator 90 will cause similar clockwise rotation of the diverter valve 60 through the lever 100 and the link 104. When the detent 98 drops into the lower most notch 96, the diverter valve 60 will be maintained in the position seen in FIG. 6. In this position of the diverter valve 60, the curved outer surface of the shutter member 80 will cooperate with the inner curved surface of the section 52 and the edge 116 of lip 114 to close the opening 50 in the upper wall 40 of the housing 30 thereby sealing off the duct 54. At the same time, two front and rear openings in the diverter valve 60 will allow the heated air to flow in the direction of the arrows from the inlet opening 32 in the housing 30 to the three outlet openings 34–38 thereof to provide heated air to the rear passengers at floor level. In this position of the diverter valve 60, the shutter member 78 is located parallel to the flow of the heated air.

Although not shown, the outside area of the console 20 adjacent the actuator 90 will have suitable indicia to indicate where the finger-operated projection 110 should be located for permitting the diverter valve 60 to be properly positioned so that the cooled air exits the port 58 in the upper rear end of the console 20 and the heated air exits the lower outlet openings 34–38. In addition, it will be noted that although three outlet openings 34–38 are shown provided in the housing for allowing heated air to flow along the floor of the vehicle to the rear passengers, if desired, one outlet opening could be substituted for the three without effecting the operation of the diverter valve assembly 28 according to the present invention.

Various changes and modifications can be made in the above-described diverter valve assembly without departing from the spirit of the invention. Such changes and modifications are contemplated by the inventor and he does not wish to be limited except by the scope of the appended claims.

The embodiments of the invention in which an exclusive property or privilege is claimed are defined as follows:

1. In combination with a heating, ventilating, and air conditioning unit, a duct connected at one end thereof to said unit for allowing treated air to flow therethrough, an air flow diverter valve assembly having a housing provided with an air inlet opening and at least a pair of air outlet openings, the other end of said duct connected to said air inlet opening of said housing, one of said pair of air outlet openings serving to allow heated air to flow from said unit to the passenger area of said vehicle at a first level for distributing said treated air along the floor of said vehicle, the other of said pair of air outlets being located in the upper wall of said housing between said inlet opening and said one of said pair of air outlet openings and serving to allow said treated air to flow to a second level above the floor of the vehicle, a diverter valve supported in said housing by a pivot shaft for pivotal movement, said diverter valve including a pair of laterally spaced end walls, each of said end walls having the general shape of a triangle and having first and second angularly spaced and intersecting edges interconnected by a peripheral edge, said first and second edges of each of said end walls being connected to said pivot shaft at their intersection, a first shutter member rigidly connected to and extending transversely between said first edges of said pair of end walls, and a second shutter member connected to and extending transversely between the peripheral edge of each of said pair of end walls beginning at the said second edge of each of said end walls and terminating intermediate said first and second edges of each of said pair of end walls so as to define an opening between said first shutter member and said second shutter member, said diverter valve having a first position wherein said first shutter member is located in a plane parallel to the flow of said treated air and said second shutter member closes said other of said pair of openings so that said treated air flows directly through said housing to said one of said pair of air outlet openings, and said diverter valve having a second position wherein said one of said pair of opening is closed by said first shutter member and said opening between said first and second shutter members registers with said other of said pair of openings so as to cause the treated air to be diverted and to flow through said other of said pair of openings to said second level above the floor of the vehicle.

2. The combination set forth in claim 1 wherein said first and second edges of each of said side walls are straight and said first shutter member is planar in configuration.

3. The combination set forth in claim 2 wherein said second shutter member is curved in cross section.

4. The combination set forth in claim 1 wherein each of said side walls has the shape of a quarter circle.

5. In combination with a heating, ventilating, and air conditioning unit supported in a automotive vehicle, a duct connected at one end thereof to said unit for allowing treated air to flow therethrough, an air flow diverter valve assembly having a housing provided with an air inlet opening and at least a pair of air outlet openings, the other end of said duct connected to said air inlet opening of said housing, one of said pair of air outlet openings serving to allow heated air to flow from said unit to the passenger area of said vehicle at a first level for distributing said treated air along the floor of said vehicle, the other of said pair of air outlets being located in the upper wall of said housing between said inlet opening and said one of said pair of air outlet openings and serving to allow said treated air to flow to a second level above the floor of the vehicle, a diverter valve supported in said housing by a pivot shaft for pivotal movement along an axis extending substantially perpendicular to the direction of flow of said treated air, said diverter valve including a pair of laterally spaced end walls, each of said end walls having the shape of a triangle and having the first and second angularly spaced straight edges connected by a curved peripheral edge, said first straight edges of each of said end walls being connected to said pivot shaft, a first shutter member rigidly connected to and extending transversely between said first straight edges of said pair of end walls, and a second shutter member connected to and extending transversely between the curved peripheral edge of each of said pair of end walls beginning at the said second straight edge of each of said end walls and terminating intermediate said first and second straight edges of each of said pair of end walls so as to define an opening between said first shutter member and said second shutter member, said diverter valve having a first position wherein said first shutter member is located in a plane parallel to the flow of said treated air and said second shutter member closes said other of said pair of openings so that said treated air flows directly through said housing to said one of said pair of air outlet openings, and said diverter valve having a second position wherein said one of said pair of opening is closed by said first shutter member and said opening between said first and second shutter members registers with said other of said pair of openings so as to cause the treated air to be diverted and to flow through said other of said pair of openings to said second level above the floor of the vehicle.

6. In combination with a heating, ventilating, and air conditioning unit supported in a automotive vehicle, a duct connected at one end thereof to said unit for allowing treated air to flow therethrough, an air flow diverter valve assembly having a housing provided with an air inlet opening and at least a pair of air outlet openings, the other end of said duct connected to said air inlet opening of said housing, one of said pair of air outlet openings being substantially axially aligned with said air inlet opening and serving to allow heated air to flow from said unit to the passenger area of said vehicle at a first level for distributing said treated air along the floor of said vehicle, the other of said pair of air outlets being located in the upper wall of said housing between said inlet opening and said one of said pair of air outlet openings and serving to allow said treated air to flow to a second level above the floor of the vehicle, a diverter valve supported in said housing by a pivot shaft for pivotal movement along an axis extending substantially perpendicular to the direction of flow of said treated air , said diverter valve including a pair of laterally spaced end walls, each of said end walls having the shape of a quarter of a circle and having the first and second angularly spaced straight edges connected by a curved peripheral edge, said first straight edges of each of said end walls being rigidly connected to said pivot shaft, a first shutter member rigidly connected to and extending transversely between said first straight edges of said pair of end walls, and a second shutter member rigidly connected to and extending transversely between the curved edge of each of said pair of end walls beginning at the said second straight edge of each of said end walls and terminating intermediate said first and second straight edges of each of said pair of end walls so as to define an opening between said first shutter member and said second shutter member, said diverter valve having a first position wherein said first shutter member is located in a plane parallel to the flow of said treated air and said second shutter member closes said other of said pair of openings so that said treated air flows directly through said housing to said one of said pair of air outlet openings, said diverter valve having a second position wherein said one of said pair of opening is closed by said first shutter member and said opening between said first and second shutter members registers with said other of said pair of openings so as to cause the treated air to be diverted and to flow through said other of said pair of openings to said second level above the floor of the vehicle, and said diverter valve having a third position wherein said first and second shutter members assume positions to close said pair of outlet openings to prevent said treated air from flowing to said outlet openings.

7. The combination set forth in claim 6 wherein said air flow diverter valve assembly is located in a console positioned between the front seats of said automotive vehicle for directing the treated air to the rear passenger area of the vehicle.

8. The combination set forth in claim 7 wherein said other of said pair of openings in said housing is connected to a second duct located in said console that extends upwardly and has an air outlet port for directing said treated air rearwardly of said front seats.

9. The combination set forth in claim 8 wherein said console supports an actuator adjacent said second duct for moving said diverter valve to said first position, said second position, and said third position.

10. The combination set forth in claim 9 wherein said actuator is connected to said diverter valve by a link.

11. The combination set forth in claim 10 wherein said actuator is supported by said console for rotation between said first position, said second position, and said third position.

12. The combination set forth in claim 11 wherein said shaft supporting said diverter valve is connected to a first lever and said actuator is connected to a second lever, and wherein said link has its opposite ends connected by pivotal connections to said first lever and said second lever.

13. The combination set forth in claim 12 wherein the upper wall of said housing is formed with a curved section that is in sealing relationship with said second shutter member when said diverter valve is moved from said first position to said second position and to said third position.

14. The combination set forth in claim 13 wherein said housing is formed with a downwardly extending lip that cooperates with said first shutter member to divert said treated air to said second duct when said diverter valve is in said second position.

15. The combination set forth in claim 14 wherein a detent is located in said console for cooperation with notches formed in said actuator for maintaining said diverter valve in each of said first position, said second position, and said third position.

* * * * *